US010124735B2

(12) United States Patent
Du et al.

(10) Patent No.: US 10,124,735 B2
(45) Date of Patent: Nov. 13, 2018

(54) VEHICLE AND VEHICLE STEP APPARATUS

(71) Applicant: T-MAX (HANGZHOU) TECHNOLOGY CO., LTD., Hangzhou (CN)

(72) Inventors: Xinfa Du, Hangzhou (CN); Xing Fan, Hangzhou (CN); Yiming Wang, Hangzhou (CN)

(73) Assignee: T-MAX (HUANGZHOU) TECHNOLOGY CO., LTD., Hangzhou (CN)

( * ) Notice: Subject to any disclaimer, the term of this patent is extended or adjusted under 35 U.S.C. 154(b) by 68 days.

(21) Appl. No.: 15/200,830

(22) Filed: Jul. 1, 2016

(65) Prior Publication Data
US 2017/0021781 A1 Jan. 26, 2017

(30) Foreign Application Priority Data

Jul. 23, 2015 (CN) .......................... 2015 1 0438796
Jul. 23, 2015 (CN) ..................... 2015 2 0540833 U
(Continued)

(51) Int. Cl.
*B60R 3/02* (2006.01)
*B60R 16/023* (2006.01)

(52) U.S. Cl.
CPC .............. *B60R 3/02* (2013.01); *B60R 16/023* (2013.01)

(58) Field of Classification Search
CPC ..... B60R 3/02; B60R 16/023; B60R 16/0231; G07C 5/08; F16H 19/001; F16H 37/12
See application file for complete search history.

(56) References Cited

U.S. PATENT DOCUMENTS

| 4,068,542 A | 1/1978 | Brand et al. |
| 6,135,472 A | 10/2000 | Wilson et al. |

(Continued)

FOREIGN PATENT DOCUMENTS

| CN | 101381060 A | 3/2009 |
| CN | 101497325 A | 8/2009 |

(Continued)

OTHER PUBLICATIONS

International Search Report and Written Opinion of the International Searching Authority for PCT International Application No. PCT/CN2015/097927 dated Apr. 13, 2016 (13 pages).

(Continued)

*Primary Examiner* — Dale Moyer
(74) *Attorney, Agent, or Firm* — Howard & Howard Attorneys PLLC

(57) ABSTRACT

A vehicle includes a vehicle body, a door, a step, a driving device for moving the step between an extending position and a retracting position, an on-board diagnostics for obtaining a state information of the door and having an interface, a vehicle data flow reading module, an emitter, a receiver and a controller. The on-board diagnostics is mounted on the vehicle body. The vehicle data flow reading module is coupled with the interface. The emitter is coupled with the vehicle data flow reading module and configured to emit the state information. The receiver is configured to receive and decode the state information from the emitter. The controller is coupled with the driving device and the receiver and configured to control the driving device to move the step between the extending position and the retracting position based on the state information.

19 Claims, 8 Drawing Sheets

(30) Foreign Application Priority Data

| Aug. 4, 2015 | (CN) | 2015 1 0468824 |
|---|---|---|
| Aug. 4, 2015 | (CN) | 2015 1 0469324 |
| Aug. 4, 2015 | (CN) | 2015 2 0576675 U |
| Aug. 4, 2015 | (CN) | 2015 2 0580148 U |

(56) References Cited

U.S. PATENT DOCUMENTS

| 6,145,865 | A | 11/2000 | Cannara et al. |
| 8,662,512 | B2 | 3/2014 | May |
| 9,205,781 | B1* | 12/2015 | May ............... B60R 3/02 |
| 2003/0094781 | A1 | 5/2003 | Jaramillo et al. |
| 2003/0132595 | A1 | 7/2003 | Fabiano et al. |
| 2006/0181049 | A1* | 8/2006 | Kobayashi ........ B60R 3/02 |
| | | | 280/166 |
| 2008/0157500 | A1 | 7/2008 | Raley et al. |
| 2008/0179920 | A1 | 7/2008 | Watson |
| 2009/0295114 | A1 | 12/2009 | Yang et al. |
| 2010/0102288 | A1 | 4/2010 | Yang et al. |
| 2012/0025485 | A1 | 2/2012 | Yang et al. |
| 2012/0098231 | A1* | 4/2012 | Huotari .............. B60R 3/02 |
| | | | 280/166 |
| 2015/0123374 | A1* | 5/2015 | Smith ................. B60R 3/02 |
| | | | 280/166 |
| 2015/0274079 | A1 | 10/2015 | Yang et al. |
| 2016/0039346 | A1 | 2/2016 | Yang et al. |
| 2017/0036605 | A1 | 2/2017 | Du et al. |
| 2017/0036606 | A1 | 2/2017 | Du et al. |
| 2017/0036607 | A1 | 2/2017 | Du et al. |
| 2017/0036608 | A1 | 2/2017 | Du et al. |

FOREIGN PATENT DOCUMENTS

| CN | 201901077 U | 7/2011 |
| CN | 102416907 A | 4/2012 |
| CN | 203211209 U | 9/2013 |
| CN | 203460786 U | 3/2014 |
| CN | 203460787 U | 3/2014 |
| CN | 103909871 A | 7/2014 |
| CN | 104192070 A | 12/2014 |
| CN | 204149942 U | 2/2015 |
| CN | 105083136 A | 11/2015 |
| CN | 105083137 A | 11/2015 |
| CN | 204801649 U | 11/2015 |
| CN | 105128751 A | 12/2015 |
| CN | 204895311 U | 12/2015 |
| CN | 204915491 U | 12/2015 |
| JP | H0891127 A | 4/1996 |
| JP | H1111219 A | 1/1999 |
| JP | 2006199200 A | 8/2006 |
| KR | 100821687 B1 | 4/2008 |
| WO | 2006050297 A2 | 5/2006 |

OTHER PUBLICATIONS

First Office Action for Chinese Patent Application No. 201510468824.6 dated Nov. 28, 2016 (13 pages).
First Office Action for Chinese Patent Application No. 201510469324.4 dated Nov. 28, 2016 (16 pages).
First Office Action for Chinese Patent Application No. 201510438796.3 dated Nov. 30, 2016 (15 pages).
International Search Report and Written Opinion of the International Searching Authority for PCT International Application No. PCT/CN2015/100159 dated May 13, 2016 (13 pages).
Second Office Action for Chinese Patent Application No. 201510468824.6 dated May 15, 2017 (10 pages).
Communication transmitting the Extended European Search Report for European Patent Application No. 15900290.6 dated Jun. 19, 2018.
Examination Report No. 1 for Australian Patent Application No. 2015404902 dated Aug. 7, 2018.

* cited by examiner

VEHICLE AND VEHICLE STEP APPARATUS

CROSS-REFERENCE TO RELATED APPLICATIONS

The present application claims priority to and all the benefits of Chinese Patent Application No. 201510438796.3 filed on Jul. 23, 2015, Chinese Patent Application No. 201520540833.7 filed on Jul. 23, 2015, Chinese Patent Application No. 201510468824.6 filed on Aug. 4, 2015, Chinese Patent Application No. 201520576675.0 filed on Aug. 4, 2015, Chinese Patent Application No. 201510469324.4 filed on Aug. 4, 2015, and Chinese Patent Application No. 201520580148.7 filed on Aug. 4, 2015, all of which are hereby expressly incorporated herein by reference in their entirety.

BACKGROUND OF THE INVENTION

1. Field of the Invention

Embodiments of the present invention generally relate to the field of vehicle, and more particularly, to a vehicle and a vehicle step apparatus.

2. Description of the Related Art

A vehicle step apparatus mounted on a chassis of a vehicle is used to assist passengers to get on or off the vehicle. In the related art, a control circuit of the vehicle step apparatus is integrated into a control system of the vehicle, that is, a control signal of the control circuit accesses a CAN (Controller Area Network) bus of the vehicle.

The present invention is proposed based on the following problems and facts realized by the inventors.

In the related art, a control circuit of a vehicle step apparatus is integrated into a CAN bus of a vehicle. However, considering the technical confidentiality, many vehicle manufacturers may set protection measures for a communication system of the vehicle and prohibit an access of external signals. In this case, the control signal of the control circuit of the vehicle step apparatus cannot access the bus of the vehicle, so that it is difficult to integrate the control circuit of the vehicle step apparatus into the bus of the vehicle. In addition, in order to integrate the control circuit of the vehicle step apparatus into the bus of the vehicle, it is required to modify the bus of the vehicle, thus increasing the cost and the complexity of the operation, and reducing the reliability of the vehicle.

SUMMARY OF THE INVENTION

Embodiments of the present invention seek to solve at least one of the problems existing in the related art to at least some extent. Accordingly, Embodiments of the present invention provide a vehicle including a vehicle step apparatus, and the vehicle step apparatus can be controlled independently.

Embodiments of the present invention further provide a vehicle step apparatus of a vehicle.

Accordingly, embodiments of the present invention provide a vehicle including: a vehicle body; a door mounted on the vehicle body and moveable between an opened position and a closed position; a step moveable between an extending position and a retracting position; a driving device coupled with the step so as to move the step between the extending position and the retracting position; an on-board diagnostics mounted on the vehicle body and configured to obtain a state information of the door and has an interface; a vehicle data flow reading module coupled with the interface and configured to read and encode the state information; an emitter coupled with the vehicle data flow reading module and configured to emit the state information; a receiver configured to receive and decode the state information from the emitter; and a controller coupled with the driving device and the receiver and configured to control the driving device to move the step between the extending position and the retracting position based on the state information.

With the vehicle according to embodiments of the present invention, it may be easy to get on and get off for a passenger, and the step thereof may be controlled independently.

Embodiments of the present invention provide a vehicle step apparatus of vehicle, including: a step moveable between an extending position and a retracting position; a driving device coupled with the step so as to move the step between the extending position and the retracting position; an on-board diagnostics configured to obtain a state information of the door and has an interface; a vehicle data flow reading module coupled with the interface and configured to read and encode the state information; an emitter coupled with the vehicle data flow reading module and configured to emit the state information; a receiver configured to receive and decode the state information from the emitter; and a controller coupled with the driving device and the receiver and configured to control the driving device to move the step between the extending position and the retracting position based on the state information.

BRIEF DESCRIPTION OF THE DRAWINGS

Other advantages of the invention will be readily appreciated as the same becomes better understood by reference to the following detailed description when considered in connection with the accompanying drawings, wherein.

DETAILED DESCRIPTION OF THE INVENTION

Figure 1:
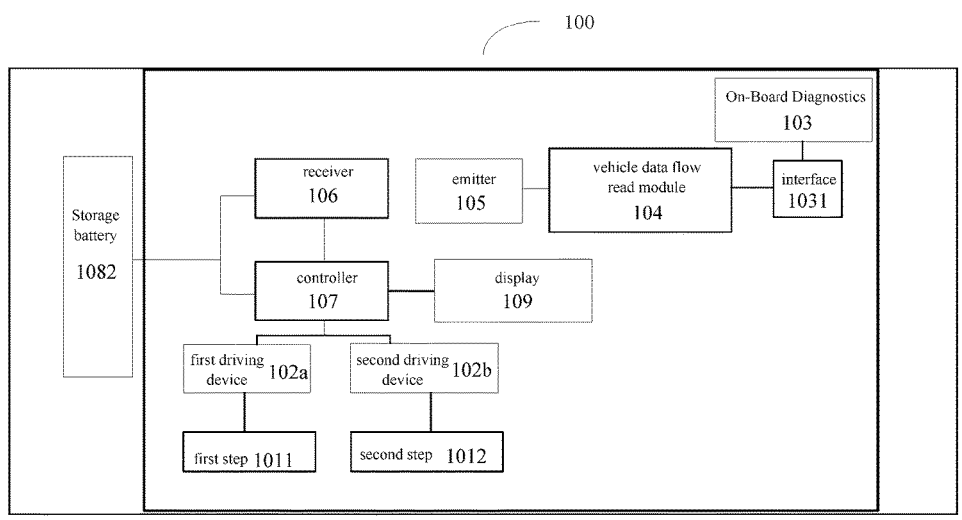
FIG. 1 is a block diagram of a vehicle step apparatus of the vehicle according to an embodiment of the present invention.

Reference will be made in detail to embodiments of the present invention. Embodiments of the present invention are shown in drawings, in which the same or similar members and the members having same or similar functions are denoted by like reference numerals throughout the descriptions. The embodiments described herein according to drawings are explanatory and illustrative, not construed to limit the present invention.

The following description provides a plurality of embodiments or examples configured to achieve different structures of the present invention. In order to simplify the publication of the present invention, components and dispositions of the particular embodiment are described in the following, which are only explanatory and not construed to limit the present invention. In addition, the present invention may repeat the reference number and/or letter in different embodiments for the purpose of simplicity and clarity, and the repeat does not indicate the relationship of the plurality of embodiments and/or dispositions. Moreover, in description of the embodiments, the structure of the second characteristic "above" the first characteristic may include an embodiment formed by the first and second characteristic contacted directly, and also may include another embodiment formed between the first and the second characteristic, in which the first characteristic and the second characteristic may not contact directly.

In the description of the present invention, unless specified or limited otherwise, it should be noted that, terms "mounted," "coupled" and "coupled" may be understood broadly, such as electronic connection or mechanical connection, inner communication between two members, direct connection or indirect connection via intermediary. These having ordinary skills in the art should understand the specific meanings in the present invention according to specific situations.

A vehicle 10 according to embodiments of the present invention will be described with reference to the drawings.

As shown in FIG. 1 to FIG. 5, the vehicle 10 according to embodiments of the present invention includes a vehicle step apparatus 100, a door 300 and a vehicle body 200. The door 300 is mounted on the vehicle body 200 and moveable between an opened position and a closed position. The vehicle step apparatus 100 includes a step 101, a driving device 102, an on-board diagnostics 103 for obtaining a state information of the door 300, a vehicle data flow reading module 104 for reading and encoding the state information, an emitter 105, a receiver 106 and a controller 107.

The step 101 is mounted on the vehicle body 200 via the driving device 102 and moveable between an extending position and a retracting position under the driving of the driving device 102. In other words, the step 101 is mounted on the driving device 102 such that the driving device 102 drives the step 101 to move between the extending position and the retracting position. The on-board diagnostics 103 is mounted on the vehicle body 200 and has an interface 1031. Here, the state information includes an opened state information and a closed state information.

The vehicle data flow reading module 104 is coupled with the interface 1031 so as to read the state information of the door 300 and encode the state information of the door 300. The emitter 105 is coupled with the vehicle data flow reading module 104 and used to emit the encoded state information. The receiver 106 is used to receive the state information from the emitter 105 and decode the state information.

Advantageously, the vehicle data flow reading module 104 is configured to encrypt the state information of the door 300, the receiver 106 is configured to decrypt the state information of the door 300 received from the emitter 105.

The controller 107 is coupled with the driving device 102 and the receiver 106, and controls the driving device 102 to move the step 101 between the extending position and the retracting position based on the state information. In other words, when the receiver 106 receives the opened state information and decodes the opened state information, the controller 107 will control the driving device 102 to move the step 101 from the retracting position to the extending position. When the receiver 106 receives the closed state information and decodes the closed state information, the controller 107 will control the driving device 102 to move the step 101 from the extending position to the retracting position.

An operation of the vehicle step apparatus 100 will be described with reference to FIG. 1 to FIG. 5.

When a user opens the door 300, the on-board diagnostics 103 obtains the state information of the door 300, i.e. the on-board diagnostics 103 obtains the opened state information of the door 300. The vehicle data flow reading module 104 reads the opened state information of the door 300 via the interface 1031 of the on-board diagnostics 103, and then encodes and encrypt the opened state information of the door 300. Then the emitter 105 emits the opened state information of the door 300, and the receiver 106 receives the opened state information of the door 300 and decodes the opened state information of the door 300.

When the receiver 106 decodes the opened state information of the door 300, the controller 107 controls the driving device 102 to operate and to move the step 101 from the retracting position to the extending position, such that the user can get on the vehicle 10 or get off the vehicle 10 by stepping the step 101.

When the user closes the door 300, the on-board diagnostics 103 obtains the state information of the door 300, i.e. the on-board diagnostics 103 obtains the closed state information of the door 300. The vehicle data flow reading module 104 reads the closed state information of the door 300 via the interface 1031 of the on-board diagnostics 103, and then encodes and encrypt the opened state information of the door 300. Then the emitter 105 emits the closed state information of the door 300, and the receiver 106 receives the closed state information of the door 300 and decodes the closed state information of the door 300.

When the receiver 106 decodes the closed state information of the door 300, the controller 107 controls the driving device 102 to operate and to move the step 101 from the extending position to the retracting position.

The vehicle step apparatus 100 of vehicle 10 according to embodiments of the present invention obtains the state information of the door 300 via the on-board diagnostics 103, and controls the step 101 to extend and retract based on the state information of the door 300 which is obtained via the on-board diagnostics 103, thereby the step 101 can extend and retract automatically. Thus the user can get on the vehicle 10 and get off the vehicle 10 conveniently.

Moreover, the vehicle step apparatus 100 of the vehicle 10 controls the driving device 102 by the controller 107 independently of the vehicle' own control system, it will not increase the burden of the control system of the vehicle 10. Specifically, the vehicle step apparatus 100 is not necessary to be integrated into the control system of vehicle 10 by using the CAN bus of vehicle 10, and can be controlled by the controller 107 independently of the control system of the vehicle 10, therefore the burden of the control system of the vehicle 10 will not be increased. In addition, the vehicle step apparatus 100 is easy to control and mount.

Further, the vehicle step apparatus 100 is easy to be mounted on the vehicle body 200 and has lower failure rate. The original lines and control system of vehicle 10 is not necessary to be changed, thus avoiding generation of hidden trouble. The state information of the door 300 obtained via the on-board diagnostics 103 is stable and reliable.

Figure 2:
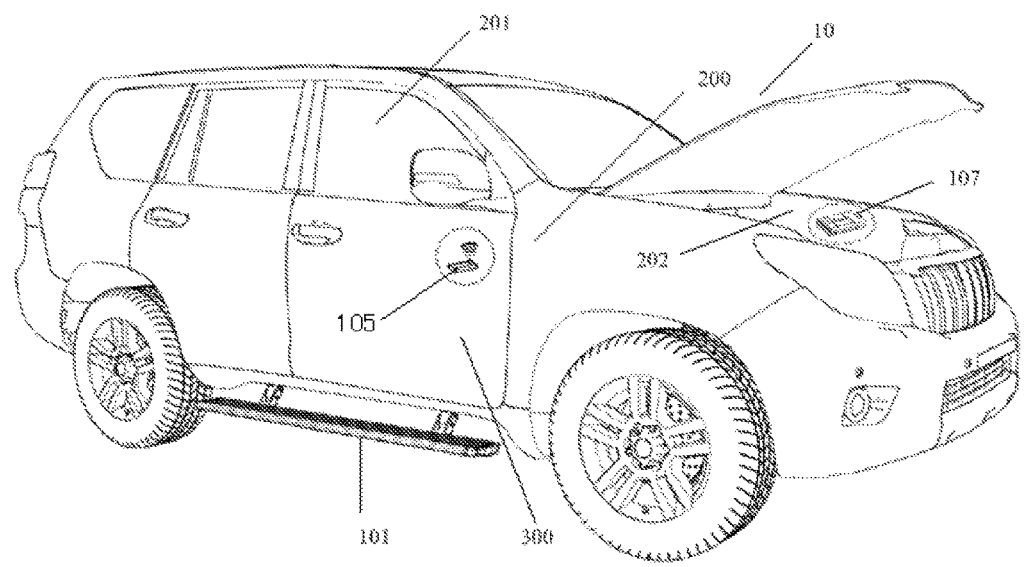
FIG. 2 is a schematic view of a vehicle according to an embodiment of the present invention.
Figure 3:
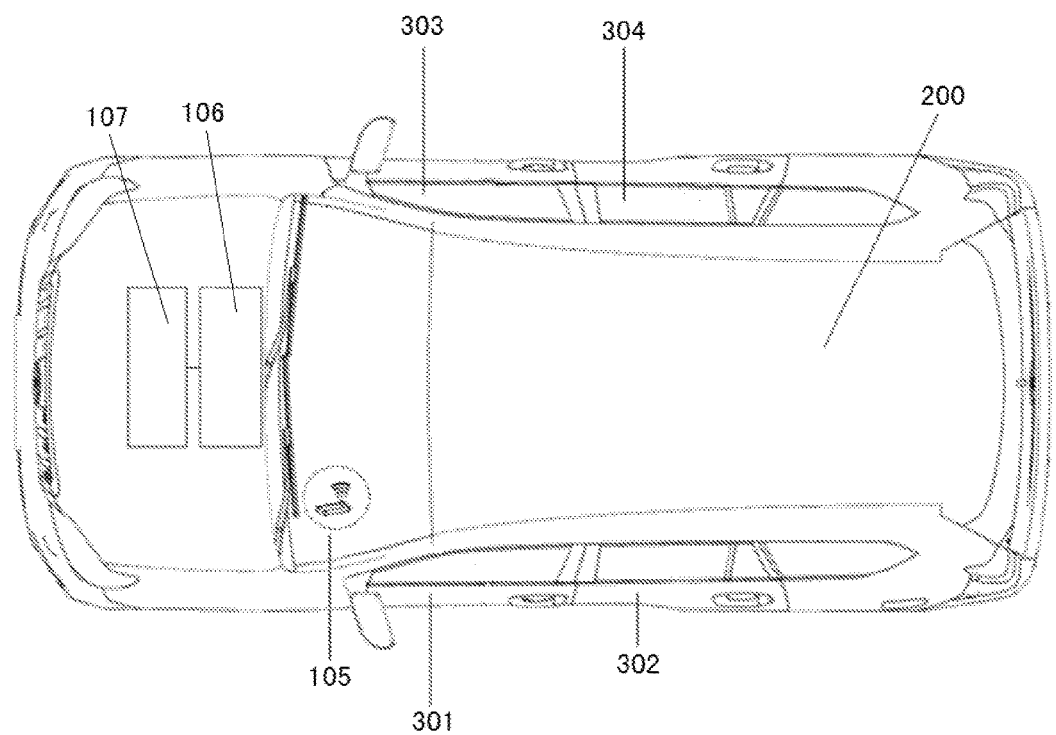
FIG. 3 is a schematic view of a vehicle according to an embodiment of the present invention.

As shown in FIG. 1 to FIG. 3, in some embodiments, the vehicle 10 includes the vehicle body 200, the door 300, the step 101, the driving device 102, the on-board diagnostics 103, the vehicle data flow reading module 104, the emitter 105, the receiver 106 and the controller 107.

Advantageously, the on-board diagnostics 103 is mounted in a cab of the vehicle body 200, the emitter 105 is mounted on the vehicle body 200 and is close to the door 300. As shown in FIG. 3, the receiver 106 and the controller 107 are mounted in an engine compartment of the vehicle body 200, and the receiver 106 and the controller 107 are integral with each other.

As shown in FIG. 3, the door 300 includes a first front door 301, a first back door 302, a second front door 303 and a second back door 304. The first front door 301 and the first back door 302 are mounted on a first side (i.e. left side) of the vehicle body 200, the second front door 303 and the second back door 304 are mounted on a second side (i.e. right side) of the vehicle body 200. The on-board diagnostics 103 can obtain the state information of every one of the first front door 301, the first back door 302, the second front door 303 and the second back door 304.

Accordingly, as shown in FIG. 1, the step 101 includes first step 1011 and second step 1012, the driving device 102 includes first driving device 102a and second driving device 102b. The first step 1011 and the first driving device 102a coupled with the first step 1011 are mounted on the first side of the vehicle body 200, the second step 1012 and the second driving device 102b coupled with the second step 1012 are mounted on the second side of the vehicle body 200.

As shown in FIG. 1, the number of the emitter 105 is one. The emitter 105 is used to emit the encoded and encrypted state information of the first front door 301, the first back door 302, the second front door 303 and the second back door 304. The emitter 105 is mounted on a front part of the vehicle body 200 and is close to the first front door 301 or the second front door 303.

When at least one of the first front door 301 and the first back door 302 is opened or closed, the opened state information or the closed state information obtained via the on-board diagnostics 103 is emitted by the emitter 105. The controller 107 controls the first driving device 102a to operate so as to extend or retract the first step 1011 based on the opened state information or the closed state information.

When at least one of the second front door 303 and the second back door 304 is opened or closed, the opened state information or the closed state information obtained via the on-board diagnostics 103 is emitted by the emitter 105. The controller 107 controls the second driving device 102b to operate so as to extend or retract the second step 1012 based on the opened state information or the closed state information.

Thus, the state information of every one of the first front door 301, the first back door 302, the second front door 303 and the second back door 304 is sent to the receiver 106 by the emitter 105, the controller 107 controls the corresponding step 101 to extend or retract, based on the state information of the first front door 301, the first back door 302, the second front door 303 and the second back door 304.

Figure 4:
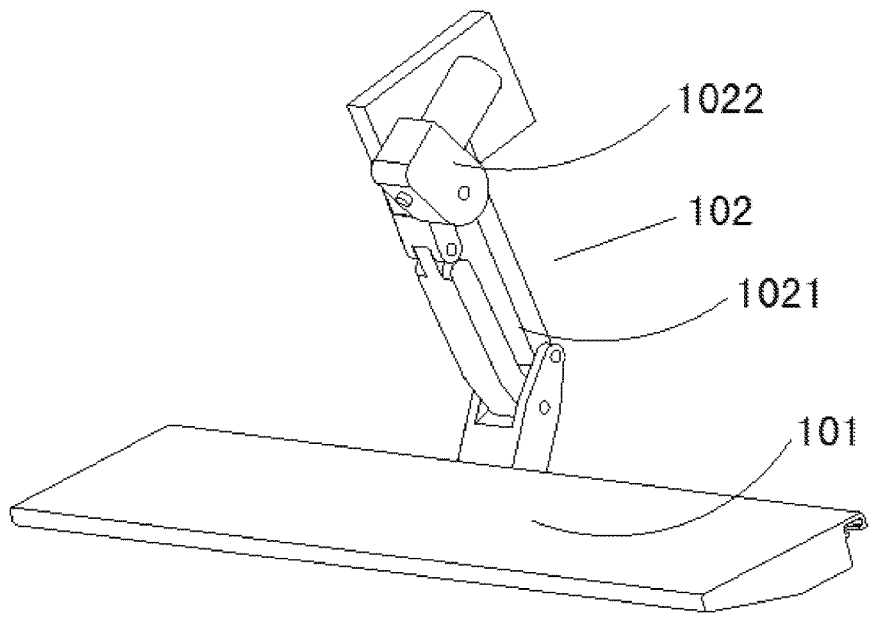
FIG. 4 is a schematic view showing a step in an extending position according to an embodiment of the present invention.
Figure 5:
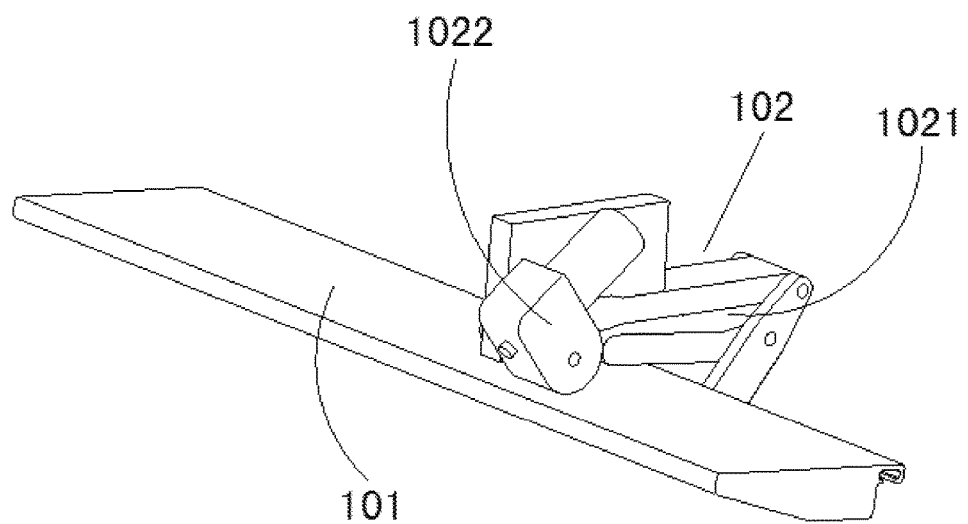
FIG. 5 is a schematic view showing a step in a retracting position according to an embodiment of the present invention.

As shown in FIG. 4 and FIG. 5, in one embodiment, the driving device 102 comprises an extending and retracting device 1021 and a motor 1022. The extending and retracting device 1021 is mounted on the vehicle body 200. The controller 107 is coupled with the motor 1022. The motor 1022 is coupled with the extending and retracting device 1021 so as to drive the extending and retracting device 1021 to extend and retract, the extending and retracting device 1021 is coupled with the step 101 so as to move the step 101 between the extending position and the retracting position.

Specifically, when the user opens the door 300, the controller 107 controls the motor 1022 to rotate forwardly, thereby the motor 1022 drives the extending and retracting device 1021 to extend, such that the extending and retracting device 1021 moves the step 101 from the retracting position to the extending position, as shown in FIG. 4. When the user closes the door 300, the controller 107 controls the motor 1022 to rotate backwardly, thereby the motor 1022 drives the extending and retracting device 1021 to retract, such that the extending and retracting device 1021 moves the step 101 from the extending position to the retracting position, as shown in FIG. 5.

FIG. 1 is a block diagram of a vehicle step apparatus 100 of the vehicle 10 according to embodiments of the present invention. As shown in FIG. 1, the vehicle step apparatus 100 includes the extending and retracting device 1021, the motor 1022, the on-board diagnostics 103, the vehicle data flow reading module 104, the emitter 105, the receiver 106 and the controller 107. Specifically, the on-board diagnostics 103 has the interface 1031.

The extending and retracting device 1021 is mounted on the vehicle body 200, and the motor 1022 is used to drive the extending and retracting device 1021 to extend and retract. The on-board diagnostics 103 is used to obtain the state information of the door 300, wherein the state information comprises the opened state information and the closed state information. The vehicle data flow reading module 104 is coupled with the interface 1031 so as to read, encode and encrypt the state information of the door 300.

The emitter 105 is coupled with the vehicle data flow reading module 104 and is used to emit the encoded and encrypted state information. The receiver 106 is used to receive the state information from the emitter 105 and decode the state information. Advantageously, the receiver 106 is wirelessly communicated with the emitter 105.

The controller 107 is coupled with the motor 1022 and the receiver 106 and controls the motor 1022 to drive the extending and retracting device 1021 to extend and retract based on the state information which is received and decoded by the receiver 106, thereby the extending and retracting device 1021 moves the step 101 between the retracting position and the extending position.

As shown in FIG. 1, the vehicle step apparatus 100 further comprises a storage battery 1082. The storage battery 1082 is electrically coupled with the receiver 106 and the controller 107 so as to supply power to the receiver 106 and the controller 107. Wherein, the interface 1031 of the on-board diagnostics 103 supplies power to the vehicle data flow reading module 104 and the emitter 105.

An operation of the vehicle step apparatus 100 will be described below. Table 1 is a truth table of a wireless communication between the emitter 105 and the receiver 106.

When the on-board diagnostics 103 detects that the door 300 is opened, the vehicle data flow reading module 104 reads, encodes and encrypts the opened state information X1 and sends the opened state information X1 to the emitter 105. The emitter 105 emits the opened state information X1, and the receiver 106 receives the opened state information X1 and output a high level V+ to the controller 107 correspondingly. Then the controller 107 controls the motor 1022 to rotate so as to drive the extending and retracting device 1021 to extend based on the high level V+ (level signal). The extending and retracting device 1021 moves the step 101 from the retracting position to the extending position, such that the user can get on the vehicle 1000 conveniently.

When the on-board diagnostics 103 detects that the door 300 is closed, the vehicle data flow reading module 104 reads, encodes and encrypts the closed state information X2 and sends the closed state information X2 to the emitter 105. The emitter 105 emits the closed state information X2, and the receiver 106 receives the closed state information X2 and output a low level V− to the controller 107 correspondingly. Then the controller 107 controls the motor 1022 to rotate so as to drive the extending and retracting device 1021 to retract based on the low level V− (level signal). The extending and retracting device 1021 moves the step 101 from the extending position to the retracting position.

TABLE 1

| Input (X) | Output (V) |
|---|---|
| the opened state information (X1) | High level (V+) |
| the closed state information (X2) | Low level (V−) |

Table 2 illustrates a corresponding relationship between input signals and output signals of the emitter 105. For example, when the door 300 is opened, a signal X indicating the state of the door 300 which corresponds to an input signal of the emitter 105 equals to the opened state information X1. The emitter 105 converts the opened state information X1 into a wireless signal Y1 which corresponds to a signal indicating the door 300 is opened and transmits the wireless signal Y1 via wireless communication such as WIFI. The receiver 106 receives the wireless signal Y1 and sends the wireless signal Y1 to the controller 107.

TABLE 2

| | Name of signal | Signal state | | remark |
|---|---|---|---|---|
| Input signal | the state information (X) | the opened state information (X1) | the closed state information (X2) | |
| Output signal | Wireless signal (Y) | Wireless signal indicating opening state of door (Y1) | Wireless signal indicating closing state of door (Y2) | wireless signal |

Table 3 illustrates a corresponding relationship between input signals and output signals of the receiver 106. Specifically, the receiver 106 receives the wireless signal Y1 which is sent from the emitter 105 and corresponds to the signal of opening the door 300. The receiver 106 converts the wireless signal Y1 into an output signal and sends the output signal to the controller 107. The output signal is a switch quantity signal of opening the door 300, such as a high level V+. The controller 107 controls the motor 1022 to rotate forwardly to drive the extending and retracting device 1021 to extend, thereby the extending and retracting device 1021 moves the step 101 to extend.

TABLE 3

| | Name of signal | Signal state | | remark |
|---|---|---|---|---|
| Input signal | Wireless signal (Y) | Wireless signal indicating opening state of door (Y1) | Wireless signal indicating closing state of door (Y2) | wireless signal |
| Output signal | switch quantity signal (V) | high level (V+) | low level (V−) | High (low) level |

In addition, when the on-board diagnostics 103 detects that the door 300 is closed, the vehicle data flow reading module 104 sends the closed state information to the emitter 105. As shown in Table 2, a signal X indicating the state of the door 300 which corresponds to an input signal of the emitter 105 equals to the closed state information X2. The emitter 105 converts the closed state information X2 into a wireless signal Y2 which corresponds to a signal indicating the door 300 is closed and transmits the wireless signal Y2 via wireless communication such as WIFI. The receiver 106 receives the wireless signal Y2 and sends the wireless signal Y2 to the controller 107.

As shown in Table 3, the receiver 106 receives the wireless signal Y2 sent from the emitter 105 and corresponds to the signal of closing the door 300. The receiver 106 converts the wireless signal Y2 into an output signal and sends the output signal to the controller 107. The output signal is a switch quantity signal of closing the door 300, such as a low level V−. Then, the controller 107 controls the motor 1022 to rotate backwardly to drive the extending and retracting device 1021 to retract, thereby the extending and retracting device 1021 retract the step 101.

As shown in FIG. 1, in some embodiments, vehicle step apparatus 100 of vehicle 10 further comprises a display 109. The display 109 is coupled with the controller 107. The display 109 is used to display an opening state and a closing state of the door 300, and an extending state and a retracting state of the step 101 under a control of the controller 107. Thus, the user can observe the extending state and the retracting state of the step 101 intuitively.

Each function unit of the vehicle step apparatus 100 may be integrated in one processing module, or each functional unit exists as an independent unit, or two or more units are integrated in one processing module. The integrated module can be embodied in hardware, or software. If the integrated module is embodied in software and sold or used as an independent product, it can be stored in the computer readable storage medium.

In some embodiments, the extending and retracting device 1021 comprises a mounting bracket 10211, a step bracket 10212 and an arm assembly 10213.

The mounting bracket 10211 is mounted on the vehicle body 200. For example, the mounting bracket 10211 is mounted on a chassis of the vehicle body 200

The step bracket 10212 is used to mount the step 101. That is to say, the step 101 is mounted on the step bracket 10212. The arm assembly 10213 is coupled between the mounting bracket 10211 and the step bracket 10212, and configured to drive the step bracket 10212 to move between the extending position and the retracting position so as to drive the step 101 to move between the extending position and the retracting position.

Advantageously, the extending and retracting device 1021 is one of a four-link mechanism 1021a, a five-link mechanism 1021b and a six-link mechanism 1021c.

Figure 6:
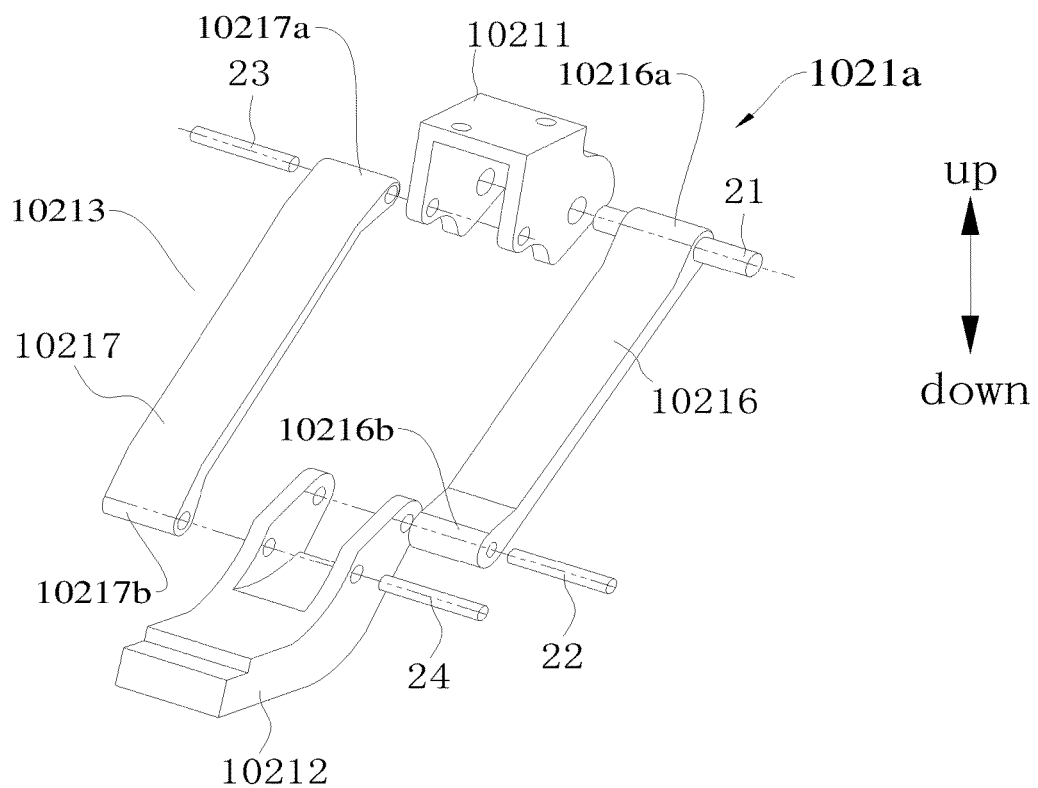
FIG. 6 is a schematic view of an extending and retracting device, in the form of a four-link mechanism, of a vehicle according to an embodiment of the present invention.

As shown in FIG. 6, the extending and retracting device 1021 is the four-link mechanism 1021a, and the arm assembly 10213 comprises a first arm 10216 and a second arm 10217.

The first arm 10216 defines an upper end 10216a and a lower end 10216b. The upper end 10216a is pivotally connected to the mounting bracket 10211 via a first connection pivot 21, the lower end 10216b is pivotally connected to the step bracket 10212 via a second connection pivot 22. The second arm 10217 defines an upper end 10217a and a lower end 10217b. The upper end 10217a is pivotally connected to the mounting bracket 10211 via a third connection pivot 23, the lower end 10217b is pivotally connected to the step bracket 10212 via a fourth connection pivot 24.

At least one of the first arm 10216 and the second arm 10217 is coupled with the motor 1022. Thus, the motor 1022 drives the at least one of the first arm 10216 and the second arm 10217 to pivot, further the at least one of the first arm 10216 and the second arm 10217 drives the step 101 to extend and retract via the step bracket 10212.

Figure 7:
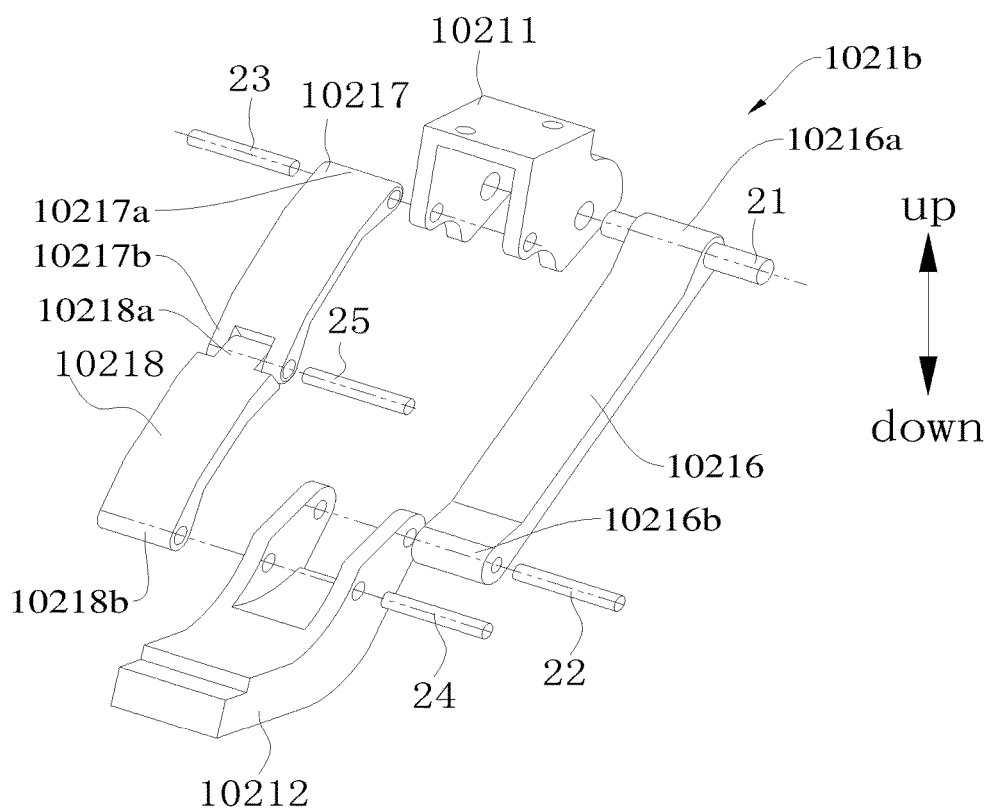
FIG. 7 is a schematic view of an extending and retracting device, in the form of a five-link mechanism, of a vehicle according to an embodiment of the present invention.

As shown in FIG. 7, the extending and retracting device 1021 is the five-link mechanism 1021b, and the arm assembly 10213 comprises a first arm 10216, a second arm 10217 and a third arm 10218. The first arm 10216 defines an upper end 10216a and a lower end 10216b. The upper end 10216a is pivotally connected to the mounting bracket 10211 via a first connection pivot 21, the lower end 10216b is pivotally connected to the step bracket 10212 via a second connection pivot 22.

The second arm 10217 defines an upper end 10217a and a lower end 10217b. The upper end 10217a is pivotally connected to the mounting bracket 10211 via a third connection pivot 23. The third arm 10218 defines an upper end 10218a and a lower end 10218b. The upper end 10218a is pivotally connected to the lower end 10217b of the second arm 10217 via a fifth connection pivot 25, the lower end 10218b is pivotally connected to the step bracket 10212 by a fourth connection pivot 24.

At least one of the first arm 10216 and the second arm 10217 is coupled with the motor 1022. Thus, the motor 1022 drives the at least one of the first arm 10216 and the second arm 10217 to pivot, further the at least one of the first arm 10216 and the second arm 10217 drives the step 101 to extend and retract by the step bracket 10212.

Figure 8:
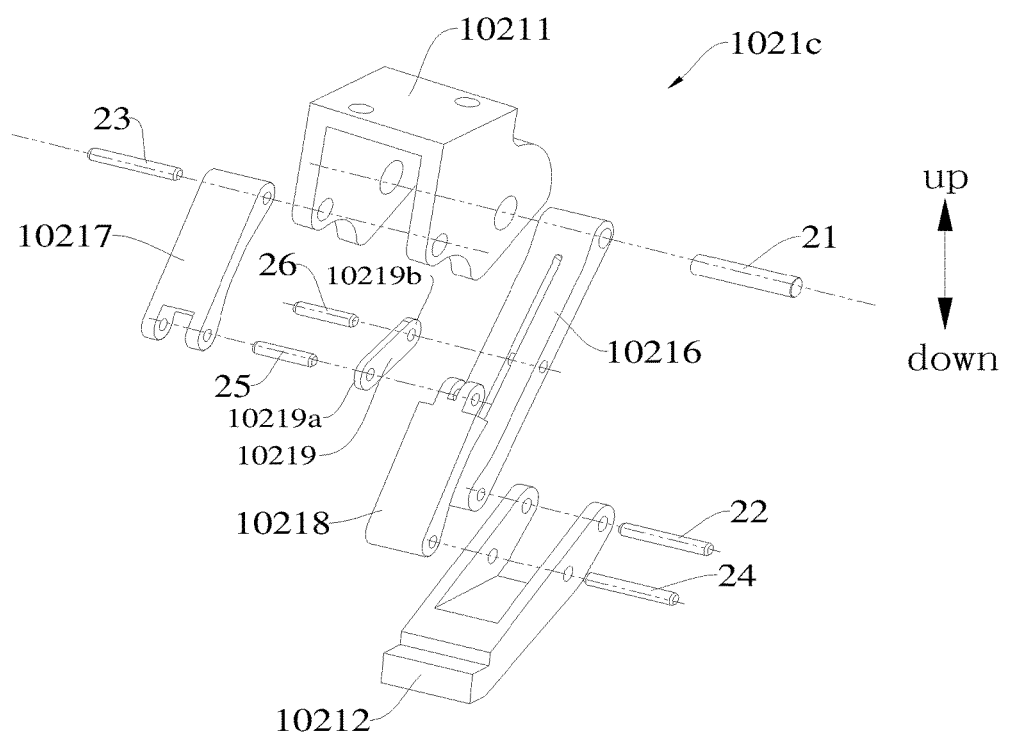
FIG. 8 is a schematic view of an extending and retracting device, in the form of a six-link mechanism, of a vehicle according to an embodiment of the present invention.

As shown in FIG. 8, the extending and retracting device 1021 is the six-link mechanism 1021c, and the arm assembly 10213 comprises a first arm 10216, a second arm 10217, a third arm 10218 and a fourth arm 10219. The first arm 10216 defines an upper end 10216a and a lower end 10216b. The upper end 10216a is pivotally connected to the mounting bracket 10211 via a first connection pivot 21, the lower end 10216b is pivotally connected to the step bracket 10212 via a second connection pivot 22.

The second arm 10217 defines an upper end 10217a and a lower end 10217b The upper end 10217a is pivotally connected to the mounting bracket 10211 via a third connection pivot 23. The third arm 10218 defines an upper end 10218a and a lower end 10218b The second end 10218b is pivotally connected to the step bracket 10212 via a fourth connection pivot 24.

The fourth arm 10219 defines a first end 10219a and a second end 10219b. The first end 10219a is pivotally connected to the lower end 10217b and the upper end 10218a via a fifth connection pivot 25. The second end 10219b is pivotally connected to a middle portion of the first arm 10216 via a sixth connection pivot 26.

At least one of the first arm 10216 and the second arm 10217 is coupled with the motor 1022. Thus, the motor 1022 drives the at least one of the first arm 10216 and the second arm 10217 to pivot, further the at least one of the first arm 10216 and the second arm 10217 drives the step 101 to extend and retract by the step bracket 10212.

Figure 9:
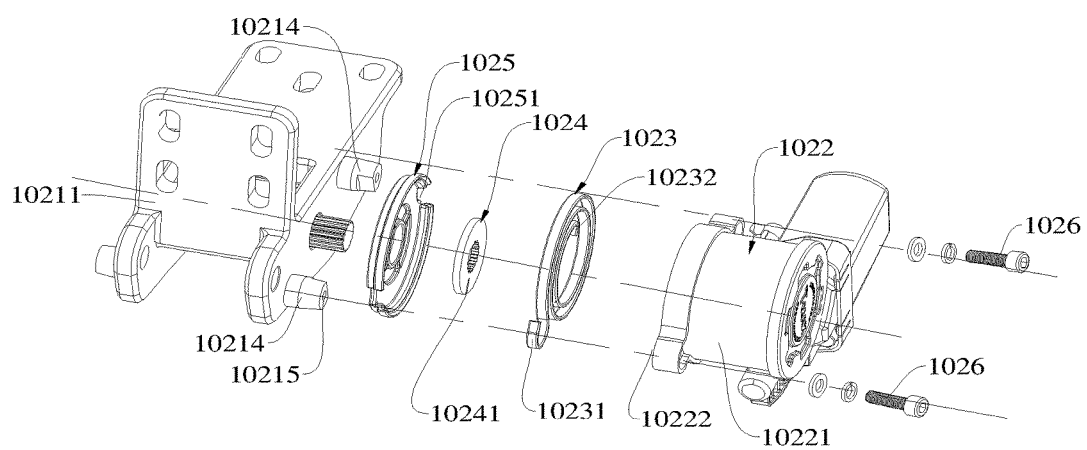
FIG. 9 is a partial exploded view of an extending and retracting device according to an embodiment of the present invention.

In some embodiments, as shown in FIG. 9, the vehicle step apparatus 100 further comprises an elastic member 1023. The elastic member 1023 is configured to elastically deform so as to store energy when the motor 1022 drives the step bracket 10212 to move towards the extending position, and to release energy so as to assist the motor 1022 to drive the extending and retracting device 1021 when the motor 1022 drives the step bracket 10212 to move towards the retracting position.

That is to say, the elastic member 1023 elastically deforms when the step 101 moves from the retracting position to the extending position, and the elastic member 1023 releases energy when the step 101 moves from the extending position to the retracting position.

It may be understood that, the load of the motor 1022 in the process of driving the step 101 to retract is bigger than that of the motor 1022 in the process of driving the step 101 to extend, so that the working current of the motor 1022 in the process of driving the step 101 to retract is larger than that of the motor 1022 in the process of driving the step 101 to extend.

Specifically, when a motor shaft of the motor 1022 rotates clockwise, the motor shaft drives the elastic member 1023 to move and makes the elastic member 1023 be deformed so as to store energy, and the step 101 is moved from the retracting position to the extending position.

When the motor shaft rotates counterclockwise, the elastic member 1023 releases energy so as to assist the motor 1022 to drive the extending and retracting device 1021 to retract. Thus, both the load and the working current of the motor 1022 are decreased, so that the working current of the motor 1022 in the process of driving the step 101 to extend approximately equals the working current of the motor 1022 in the process of driving the step 101 to retract so as to effectively protect the motor 1022 and prolong work-life of the motor 1022.

Advantageously, the elastic member 1023 comprises a scroll spring. The scroll spring defines a first end 10231 and a second end 10232. The first end 10231 of the scroll spring is fixed, and the second end 10232 of the scroll spring is driven by the motor 1022 so as to twist.

As shown in FIG. 9, an end of the outermost ring of the scroll spring is bent outwards so as to form the first end 10231, and an end of the innermost ring of the scroll spring is bent inwards so as to form the second end 10232. Thus, the first end 10231 comprises the end of the outermost ring and a portion of the outermost ring coupled with the end of the outermost ring, the second end 10232 comprises the end of the innermost ring and a portion of the innermost ring coupled with the end of the innermost ring.

When the extending and retracting device 1021 is retracted, i.e. when the step 101 is retracted, the first end 10231 of the scroll spring is fixed, and the second end 10232 of the scroll spring rotates along with the motor shaft of the motor 1022 and releases energy so as to assist to drive the extending and retracting device 1021 to retract. In addition, the structure of the scroll spring is simple and compact, and the scroll spring is easily to be mounted.

Additionally, the elastic member 1023 may be elastic sheet, belleville spring or other member which can elastically deform easily.

As shown in FIG. 9, in some embodiments, the vehicle step apparatus 100 further comprises a connecting plate 1024 and a cover 1025. A recess is formed in a casing 10221 of the motor 1022, and the cover 1025 covers the recess to define a cavity. The connecting plate 1024 is mounted in the cavity and driven by the motor 1022 to rotate. The scroll spring is mounted within the cavity, the first end 10231 of the scroll spring is fixed in the cover 1025, and the second end 10232 of the scroll spring is coupled with the connecting plate 1024.

Specifically, the connecting plate 1024 is substantially a circular plate. The connecting plate 1024 is disposed in the cavity, and the connecting plate 1024 defines a first surface opposing to the recess and a second surface opposing to the cover 1025. The connecting plate 1024 is directly or indirectly coupled with the motor shaft of the motor 1022 and is driven by the motor shaft of the motor 1022 to rotate. For example, the connecting plate 1024 is coupled with the motor shaft of the motor 1022 via splined connection.

The scroll spring is fitted over the connecting plate 1024, and the second end 10232 of the scroll spring is coupled with the connecting plate 1024 and rotates along with the connecting plate 1024. Thus, the scroll spring can be integrated in the motor 1022 so as to decrease transmission loss and make the structure of the vehicle step apparatus 100 more compactly.

Advantageously, the cover 1025 is detachably fastened to the casing 10221. A limitation notch 10251 is formed in the cover 1025, and a limitation column 10214 is formed on the mounting bracket 10211, and the limitation column 10214 is fitted within the limitation notch 10251 to mount the cover 1025 to the mounting bracket 10211. The first end 10231 of the scroll spring is fitted over the limitation column 10214.

The recess is formed in a side of the casing 10221 facing the mounting bracket 10211. The cover 1025 comprises a cover body and a flange coupled with an edge of the cover body. A stepped positioning surface is formed on an inner wall of the flange, and the cover 1025 covers the recess via the stepped positioning surface. The limitation notch 10251 extends from an edge of the cover 1025 to an inner of the cover 1025.

The limitation column 10214 is formed on a side of the mounting bracket 10211 opposing to the motor 1022, and a catch groove fitted with the limitation notch 10251 is formed in the limitation column 10214. The cover 1025 bears against the casing 10221 via lower surfaces of the catch groove of two limitation column 10214 so as to limit the cover 1025 in the axial direction. Side surfaces of the catch grooves of two limitation column 10214 limit the cover 1025 in both the radial direction and the circumferential direction. The second end 10232 of the scroll spring is passed through the limitation notch 10251 and fitted over the limitation column 10214.

Thus, the cover 1025, the casing 10221 and the mounting bracket 10211 are fixed with one another so as to provide a suitable position for fixing the second end 10232 of the scroll spring, so that a twisted deformation of the scroll spring is decreased during mounting and using.

The cover 1025, the connecting plate 1024 and the recess may be a circular shape, an elliptical and so on. The number of the limitation notch 10251 is more than two, and a plurality of the limitation notch 10251 is provided and evenly spaced apart from each other along a circumferential direction of the cover 1025. The number of the limitation column 10214 is more than two.

As shown in FIG. 9, a catch groove 10241 is formed in an outer circumferential surface of the connecting plate 1024, and the second end 10232 of the scroll spring is inserted into and fitted within the catch groove 10241.

Specifically, as shown in FIG. 9, the catch groove 10241 extends from an edge of the connecting plate 1024 to an inner of the connecting plate 1024, and the catch groove 10241 extends along the radial direction of the connecting plate 1024.

In an embodiment, a mounting hole 10222 is formed in the casing 10221, and the limitation column 10214 is passed through the mounting hole 10222. A threaded hole 10215 is formed in the limitation column 10214, the motor 1022 is mounted on the mounting bracket 10211 via a bolt 1026 fitted within the threaded hole 10215.

Specifically, the limitation column 10214 passes through the limitation notch 10251 and bears against the casing 10221 of the motor 1022. The mounting hole 10222 is in one-to-one relationship with the threaded hole 10215. The bolt 1026 passes through the mounting hole 10222, and is fitted within the threaded hole 10215 so as to mount the casing 10221 to the mounting bracket 10211. Thus, the motor 1022, the connecting plate 1024 and the mounting bracket 10211 are mounted together via the bolt 1026, and it is easy to change and maintain the scroll spring.

In addition, the casing 10221, the connecting plate 1024 and the mounting bracket 10211 are mounted together via welding or other suitable manner.

Reference throughout this specification to "an embodiment," "some embodiments," "an example," "a specific example," or "some examples," means that a particular feature, structure, material, or characteristic described in connection with the embodiment or example is included in at least one embodiment or example of the present invention. The appearances of the phrases throughout this specification are not necessarily referring to the same embodiment or example of the present invention. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present invention, and changes, alternatives, and modifications can be made in the embodiments without departing from spirit, principles and scope of the present invention.

What is claimed is:

1. A vehicle, comprising:
   a vehicle body;
   a door mounted on the vehicle body and moveable between an opened position and a closed position;
   a step moveable between an extending position and a retracting position;
   a driving device coupled with the step so as to move the step between the extending position and the retracting position;
   an on-board diagnostics mounted on the vehicle body and configured to obtain a state information of the door and has an interface;
   a vehicle data flow reading module coupled with the interface and configured to read and encode the state information;
   an emitter coupled with the vehicle data flow reading module and configured to emit the state information;
   a receiver configured to receive and decode the state information from the emitter; and
   a controller coupled with the driving device and the receiver, and configured to control the driving device to move the step between the extending position and the retracting position based on the state information, wherein the vehicle further comprises a display coupled with the controller, and configured to display an opening state and a closing state of the door, and an extending state and a retracting state of the step.

2. The vehicle as set forth in claim 1, the on-board diagnostics is mounted in a cab of the vehicle body, the emitter is mounted on the vehicle body and is close to the door, the receiver and the controller are mounted in an engine compartment of the vehicle body.

3. The vehicle as set forth in claim 1, wherein the receiver is wirelessly communicated with the emitter.

4. The vehicle as set forth in claim 1, wherein the receiver and the controller are integral with each other.

5. The vehicle as set forth in claim 1, further comprising a storage battery electrically coupled with the receiver and the controller and configured to supply power to the receiver and the controller.

6. The vehicle as set forth in claim 1, wherein the vehicle data flow reading module is configured to encrypt the state information, the receiver is configured to decrypt the state information from the emitter.

7. The vehicle as set forth in claim 1, the driving device comprises:
- an extending and retracting device mounted on the vehicle body and coupled with the step so as to move the step between the extending position and the retracting position; and
- a motor coupled with the controller and the extending and retracting device and configured to drive the extending and retracting device to extend and retract.

8. The vehicle as set forth in claim 7, the extending and retracting device comprises:
- a mounting bracket mounted on the vehicle body;
- a step bracket for mounting the step; and
- an arm assembly coupled between the mounting bracket and the step bracket and configured to drive the step bracket to move between the extending position and the retracting position.

9. The vehicle as set forth in claim 8, the extending and retracting device is one of a four-link mechanism, a five-link mechanism and a six-link mechanism.

10. The vehicle as set forth in claim 9, the extending and retracting device is the four-link mechanism, the arm assembly comprises:
- a first arm defining an upper end pivotally connected to the mounting bracket and a lower end pivotally connected to the step bracket; and
- a second arm defining an upper end pivotally connected to the mounting bracket and a lower end pivotally connected to the step bracket, wherein at least one of the first arm and the second arm is coupled with the motor.

11. The vehicle as set forth in claim 9, the extending and retracting device is the five-link mechanism, the arm assembly comprises:
- a first arm defining an upper end pivotally connected to the mounting bracket and a lower end pivotally connected to the step bracket; and
- a second arm defining an upper end pivotally connected to the mounting bracket and a lower end; and
- a third arm defining an upper end pivotally connected to the lower end of the second arm and a lower end pivotally connected to the step bracket, wherein at least one of the first arm and the second arm is coupled with the motor.

12. The vehicle as set forth in claim 9, the extending and retracting device is the six-link mechanism, the arm assembly comprises:
- a first arm defining an upper end pivotally connected to the mounting bracket and a lower end pivotally connected to the step bracket;
- a second arm defining an upper end pivotally connected to the mounting bracket and a lower end;
- a third arm defining an upper end and a lower end pivotally connected to the step bracket; and
- a fourth arm defining a first end pivotally connected to the lower end of the second arm and the upper end of the third arm and a second end pivotally connected to a middle portion of the first arm, wherein at least one of the first arm and the second arm is coupled with the motor.

13. The vehicle as set forth in claim 8, further comprising an elastic member configured to elastically deform so as to store energy when the motor drives the step bracket to move to the extending position, and to release energy so as to assist the motor to drive the extending and retracting device when the motor drives the step bracket to move towards the retracting position.

14. The vehicle as set forth in claim 13, the elastic member comprises a scroll spring defining a fixed first end and a second end driven by the motor so as to twist.

15. The vehicle as set forth in claim 14, further comprising a cover and a connection plate,
- wherein a recess is formed in a casing of the motor, and the cover covers the first recess to define a cavity,
- wherein the connection plate is mounted in the cavity and driven by the motor to rotate,
- wherein the scroll spring is mounted within the cavity, the first end of the scroll spring is fixed in the cover, and the second end of the scroll spring is coupled with the connection plate.

16. The vehicle as set forth in claim 15, the cover is detachably fastened to the casing,
- wherein a limitation notch is formed in the cover, a limitation column is formed on the mounting bracket, the limitation column is fitted within the limitation notch to mount the cover on the mounting bracket,
- wherein the first end of the scroll spring is fitted over the limitation column.

17. The vehicle as set forth in claim 16, wherein a catch groove is formed in an outer circumferential surface of the connecting plate, the second end of the scroll spring is inserted into and fitted within the catch groove.

18. The vehicle as set forth in claim 17,
- wherein a mounting hole is formed in the casing, the limitation column is passed through the mounting hole,
- wherein a threaded hole is formed in the limited column, the motor is mounted on the mounting bracket via a bolt fitted within the threaded hole.

19. A vehicle step apparatus, comprising:
- a step moveable between an extending position and a retracting position;
- a driving device coupled with the step so as to move the step between the extending position and the retracting position;
- an on-board diagnostics configured to obtain a state information of the door and has an interface;
- a vehicle data flow reading module coupled with the interface and configured to read and encode the state information;
- an emitter coupled with the vehicle data flow reading module and configured to emit the state information;

a receiver configured to receive and decode the state information from the emitter; and a controller coupled with the driving device and the receiver and configured to control the driving device to move the step between the extending position and the retracting position based on the state information, wherein the vehicle step apparatus further comprises a display coupled with the controller, and configured to display an opening state and a closing state of the door, and an extending state and a retracting state of the step.

\* \* \* \* \*